United States Patent Office 3,845,220
Patented Oct. 29, 1974

3,845,220
COFFEE CARBONATED BEVERAGE
Shigeyoshi Suzuki, Osaka, Japan, assignor to Ogawa & Co., Ltd., Osaka, Japan
No Drawing. Filed Aug. 30, 1972, Ser. No. 284,986
Claims priority, application Japan, Oct. 21, 1971, 46/83,776
Int. Cl. A23l 1/00
U.S. Cl. 426—45                    6 Claims

ABSTRACT OF THE DISCLOSURE

A coffee carbonated beverage. The beverage contains an enzymatically-treated coffee liquid and a suitable amount of carbonated water. The coffee liquid is prepared in such a manner that at least one aqueous solution selected from a group of aqueous solutions of enzymes which control the foam producing property or the foam stabilizing property, is added to a solution of extract liquor of parched coffee beans and then after proper enzymatic reaction, said liquid is processed with deactivation and sterilization. Said group of aqueous solutions comprises an aqueous solution of protease, amylase, cellulase, hemicellulase and pectinase.

---

The present invention relates to coffee carbonated beverage, and provides coffee carbonated beverage which presents the external appearance and the physical state as in the conventional soda water, which is rich in a natural flavor peculiar to coffee and which is stable over a long period.

In recent times, coffee, an excellent beverage, has been consumed more and more in a world-wide sense. It may be prepared by boiling parched coffee beans and recovering the coffee by the use of a siphon filter cloth or the like, or by pouring boiling water on to instant coffee and adding sugar.

On the other hand, carbonated refreshing drinks with cola-type or citrus type aromas have also permeated national life. The consumption of this drink is steadily increasing.

In view of these circumstances, in order to realize greater consumption of like beverages, the present inventor conducted repeated researches with the intention of uniting coffee and the carbonated drinks with their retention of their excellent properties. As a result, the coffee carbonated beverage according to the present invention in which coffee is mixed thereinto with carbonated water has been finally accomplished.

Many researchers have hitherto conducted a number of trials in which a coffee extract liquid is obtained from coffee beans, and sweetening material such as sugar and carbonated water with a water-soluble flavor are added thereto, to thus produce coffee carbonated beverage.

In the coffee extract, however, there exists a substance liable to promote foaming. The coffee extract therefore foams violently to cause overflow, when the carbonated water is added thereto and is poured into a container such as a glass bottle, when the filled container has its stopper opened, and when the coffee carbonated beverage is poured into a glass. For this reason, such objectionable foaming properties are disadvantageous in the manufacturing process and during drinking.

In solving the problem, a method was tried wherein the coffee extract liquid was admixed with asbestos diatomaceous earth or the like as a filtration assistant, and then was filtered with filter paper, filter cloth or the like. It was impossible, however, to suppress the foaming of coffee carbonated beverage.

A further treatment was carried out in which the pH of the coffee extract is shifted towards either the acidic or alkaline side, and insoluble deposits produced were removed by filtration or centrifugal separation. With such treatment it was also impossible to satisfactorily control the foaming.

Another solution for the foaming problem is that a thermo-coagulating and soluble protein such as albumen is added to the coffee extract. After dissolution of the albumen, the coffee extract liquid is heated. Thus, proteins, polysaccharides and other materials suspended in the coffee extract are absorbed onto the albumen, whereby they are coagulated. The coagulated materials are removed by filtration, centrifugal separation or the like, to obtain a clear coffee extract liquid. Then, sugar and carbonated water is added thereto, and is poured into a glass bottle. The coffee carbonated beverage, however, foams more intensely than the coffee carbonated beverage with no treatment. In addition, it is caused to smell fishy. Therefore, this method also cannot attain the expected object. The above drawbacks result from the fact that globulin (glyco protein) contained in the albumen remains in the coffee extract liquid to promote the foaming, while the fish-like smell is caused by the odor absorbed on the albumen.

Another known coffee carbonated beverage is produced as follows. At least 5% by volume of organic solvent such as ethyl alcohol, isopropyl alcohol, acetone and methyl ethyl ketone is incorporated and mixed into the coffee extract liquid. Insoluble matters are deposited, and are removed. Thereafter, the added organic solvent, is completely eliminated by distillation under reduced pressure. The coffee carbonated beverage with the coffee extract liquid thus treated presents neither violent foaming nor maintenance of the foams.

The coffee extract liquid and the coffee carbonated beverage thus treated with the organic solvents, however, are very poor in flavor and high in production cost. After all, the organic solvent-treatment process also cannot accomplish the intended object.

The disadvantages of the series of above mentioned treatment are attributable to the lack of correct recognition to the cause of the foaming phenomenon.

A foam, strictly, is a gas enveloped by a liquid or solid. The foaming phenomenon has been observed, and analyzed and applied in a variety of fields. As to the foaming, two factors of i.e. foam producing property and foam stabilizing property should be taken into consideration. Both the factors can be generally considered to be independent of each other. Which factor should be emphasized in the evaluation of foaming differs in dependence on the respective cases. For example, lukewarm beer foams more than a cold one. In beer and Coca-Cola (trademark), $CO_2$ gas is dissolved into a liquid under pressure. The foams appear when the pressure is lowered when on opening a stopper. Herein, the solubility of $CO_2$ gas is higher at a lower temperature. Accordingly, when the drinks are lukewarm, $CO_2$ gas is likely to be released due to incapability of the dissolution and produces foams more.

Further, the foams are more difficult to dissipate in beer than in Coca-Cola (trademark). This is attributable to the strength of bonding of the molecules of substances existing in the liquid in the dissolved state. If the intermolecular bonding force at the surface of the foam is strong, the foam is hard to dissipate. Protein and resins in beer are stronger in the bonding, are contained in larger quantities, and are more adherent to the foams, thereby stabilizing the air bubbles. In contrast, such substances high in the intermolecular bonding strength are scarcely contained in Coca-Cola which is a flavored beverage.

An account of these two factors, the foaming phenomena differ very largely when both are poured into glasses.

In case of coffee carbonated beverage, it is accordingly necessary to discover in the coffee extract liquid a substance which is strong in intermolecular bonding force and decompose or remove it by appropriate treatment without degrading the flavor.

The present inventor studied substances contained in the coffee extract liquid, in detail with regard to foaming. As a result, the main factor has been finally revealed.

Proteins, peptides and starches which are contained in coffee beans and their aqueous extract liquid, constitute the main factors.

The enzymes such as, protease and amylase which peculiarly act on only these substances are solely or jointly used to decompose and remove said substances. The enzymatically-treated coffee extract liquid thus obtained, is admixed with sugar as well as carbonated water, and is poured into a bottle. Then, unlike the circumstances in the prior art, the coffee carbonated beverage does not exhibit any overflow accompanied with violent foaming. In addition, when the stopper of the bottle is opened and when the coffee carbonated beverage is poured into a glass, the external appearance and the physical state as in the usual carbonated beverage are presented without the intense foaming and maintenance of the foams. In this manner, there can be obtained a coffee carbonated water which causes no trouble in manufacture and for drinking and which gives a natural flavor specific to coffee.

The present invention shall cover a coffee extract liquid in which a dried matter of coffee extract liquid (instant coffee) is dissolved.

Furthermore, cellulose, hemicellulose, pectin etc. in the coffee beans and the extract liquid also take part in the foam producing property and the foam stabilizing property subsidiarily. One or more of these substances are decomposed and from the liquid by the action of the enzymes of cellulase, hemicellulase and pectinase which peculiarly act on the substances, respectively. It is thereby possible that, in addition to the respective treatments by protease and amylase the foam producing property and the foam stabilizing property are restrained more effectively by subjecting the liquor to respective treatments by cellulase, hemicellulase and protease.

Description will now be made of a few examples of the present invention.

EXAMPLE 1

100 g. of parched coffee beans and 500 g. of water were weighed, were mixed, and were held at 30–50° C. Each aqueous solution containing one of the enzymes, i.e., 100–180 units/ml. of protease and 50–80 units/ml. of amylase was held at 35–50° C. for 30 minutes. One or more of the respective enzymatic solutions thus activated each amounting to 2 ml. were added to the mixture consisting of the parched coffee beans and water. The mixture added with the enzymatic solution or solutions was maintained at 35–50° C. for 60–180 minutes, and the reactions were uniformly promoted under agitation of 40–70 revolutions/min. Thereafter, it was subjected to an instantaneous sterilization at 120° C. for 3 seconds, or was held at 80° C. for 30 minutes, so as to deactivate the enzymes.

Further, the mixture thus processed was subjected to centrifugal separation and filtration under pressure, to remove the beans and insoluble matter. Then, 310 g. of transparent enzymatically-treated coffee liquid was obtained.

Coffee carbonated beverage is produced by a process of manufacture similar to those for various kinds of carbonated refreshing drinks.

More specifically, 20 g. of sugar was dissolved in 50 g. of the enzymatically-treated coffee liquid. The solution was cooled up to less than 10° C. 145 g. of carbonated water (10° C., 3.8 kg./cm.) was added thereto, was agitated, and was made uniform. Thereafter, 200 ml. of the solution was poured into a glass bottle of 220 ml. and a stopper was put on. Thus, coffee carbonated water was obtained.

The product obtained in this way, was coffee carbonated water which exhibited no violent foaming and no overflow during both manufacture and drinking, which was rich in the natural flavor of coffee, and which was stable over a long period.

EXAMPLE 2

100 g. of parched coffee beans and 500 g. of water were weighed, were mixed, and were held at 80–100° C. for 10 seconds. Immediately after stopping the heating, the mixture was subjected to filtration and centrifugal separation. 320 g. of extract liquid was thereby obtained, and it was quickly cooled at 35–50° C. Each enzymatic solution containing one of the following enzymes, i.e., 100–150 units/ml. of protease and 30–80 units/ml. of amylase, was held at 35–50° C. for 30 minutes, and were thereby enzymatically activated. One or more of the respective enzymatic solutions, each amounting to 1 ml., were added to 100 g. each of the coffee extract liquid. The enzymatic reactions were conducted at 35–50° C. and under agitation of 40–70 revolutions/min. for 60–180 minutes.

After completion of the reactions, the coffee extract liquid was subjected to an instantaneous sterilization, or was held at 80° C. for 30 minutes, so as to carry out the sterilization and the deactivation of the enzymes. Then, it was subjected to filtration under pressure. Thus, enzymatically-treated coffee liquid was obtained. Coffee carbonated beverage was produced as in Example 1.

EXAMPLE 3

100 g. of parched coffee beans and 500 g. of water were weighed, were mixed, and were held at 30–50° C. Each aqueous solution containing one of the enzymes, i.e., 80–150 units/ml. of cellulase, 120–250 units/ml. of hemicellulase and 100–300 units/ml. of pectinase, was held at 30–50° C. for 30 minutes. Thus, they were activated. One or more of the respective enzymatic solutions, each amounting to 3 ml., were added to the mixture consisting of the parched coffee beans and water.

The mixed liquid was subjected to the enzymatic reactions under agitation of 40–70 revolutions/mil. at 30–50° C. for 60–180 minutes. Thereafter, it was subjected to an instantaneous sterilization at 120° C. for 3 seconds, or was maintained at 80° C. for 30 minutes, so as to deactivate the enzymes.

Subsequently, it was subjected to sieve filtration and cerite filtration under pressure, to remove the beans and insoluble matter. Thus, 320 g. of transparent enzymatically-treated coffee liquid was obtained. Coffee carbonated beverage was produced as in Example 1.

EXAMPLE 4

300 g. of aqueous mixture liquid or aqueous extraction liquid of the parched coffee beans as stated in Example 1 or 2, was held at 30–50° C.

Each aqueous solution containing one of the enzymes, i.e., 70–150 units/ml. of protease, 50–80 units/ml. of amylase, 70–160 units/ml. of cellulase, 100–250 units/ml. of hemicellulase and 90–300 units/ml. of pectinase, was held at 30–50° C. for 30 minutes, and were thereby activated. One or more of the respective activated enzyme solutions, each amounting to 3 ml. were added to the above-mentioned aqueous mixture or extract liquid.

The mixed solution thus prepared, was subjected to the enzymatic reactions under agitation of 40–70 revolutions/min. at 30–50° C. for 60–180 minutes. Thereafter, it was subjected to an instantaneous sterilization at 120° C. for 3 seconds, or was maintained at 80° C. for 30 minutes, to deactivate the enzymes.

Subsequently, it was subjected to centrifugal separation and celite filtration under pressure. Then, 290° g. of transparent enzymatically-treated coffee liquid was obtained. Coffee carbonated water was produced as in Example 1.

In any of the foregoing Examples 1 to 4, in case of jointly using the enzymes, the combination and the amount of units used can be arbitrarily selected, and a fully satisfactory elimination of or a suppressing effect of the foam producing property and the foam stabilizing property can be attained.

What is claimed is:

1. A method for controlling the foam production and foam stabilization properties of coffee carbonated beverages which comprises adding to an aqueous extraction liquid or an aqueous immersion liquid of parched coffee beans, an aqueous solution of an enzyme selected from the group consisting of protease, amylase, cellulase, hemicellulase and pectinase for sufficient time to alter said foam production and foam stabilization properties, then heating the resultant liquid to deactivate said enzymes and to sterilize said beverage.

2. The coffee carbonated beverage produced by the method of claim 1.

3. A method according to claim 1 wherein the enzyme solution is agitated with the coffee liquid at 30 to 50° C. for 60 to 180 minutes.

4. A method according to claim 3 wherein the enzyme treated coffee liquid is heated at 120° C. for 3 seconds to sterilize said liquid.

5. A method according to claim 3 wherein the enzymes in the coffee liquid are heated to deactivate the enzymes.

6. A method according to claim 5 wherein the heating is at 80° C. for 3 minutes.

References Cited

UNITED STATES PATENTS

| | | | |
|---|---|---|---|
| 2,478,169 | 8/1949 | Kellogg | 99—79 |
| 2,118,184 | 5/1938 | Fronmuller et al. | 99—65 |
| 2,860,987 | 11/1958 | Werner | 99—48 |
| 2,223,753 | 12/1940 | Wallerstein | 99—48 |
| 3,597,219 | 8/1971 | Wildi et al. | 99—48 |
| 3,055,757 | 9/1962 | Segel | 99—48 |
| 2,418,858 | 4/1947 | Urquhart | 261—76 |
| 2,282,139 | 5/1942 | Kellogg | 426—45 |
| 2,526,873 | 10/1950 | Johnston | 426—45 |
| 3,397,061 | 8/1968 | Katz | 426—45 |

MORRIS O. WOLK, Primary Examiner

S. MARANTZ, Assistant Examiner

U.S. Cl. X.R.

426—148, 193, 477